United States Patent
Liu et al.

(10) Patent No.: US 10,723,914 B2
(45) Date of Patent: Jul. 28, 2020

(54) FORMULATION CONTAINING A METAL APROTIC ORGANOSILANOXIDE COMPOUND

(71) Applicant: Dow Silicones Corporation, Midland, MI (US)

(72) Inventors: Nanguo Liu, Midland, MI (US); Susan Rhodes, Concord, OH (US); Nick Evan Shephard, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 18 days.

(21) Appl. No.: 16/316,073

(22) PCT Filed: Jun. 7, 2017

(86) PCT No.: PCT/US2017/036276
§ 371 (c)(1),
(2) Date: Jan. 8, 2019

(87) PCT Pub. No.: WO2018/013262
PCT Pub. Date: Jan. 18, 2018

(65) Prior Publication Data
US 2020/0140687 A1 May 7, 2020

Related U.S. Application Data

(60) Provisional application No. 62/361,774, filed on Jul. 13, 2016.

(51) Int. Cl.
| | | |
|---|---|---|
| C09D 183/04 | (2006.01) | |
| C08K 5/5415 | (2006.01) | |
| C08L 83/04 | (2006.01) | |
| C08K 3/36 | (2006.01) | |
| C08K 5/5435 | (2006.01) | |
| C08K 5/00 | (2006.01) | |
| C08K 5/5419 | (2006.01) | |
| C08K 9/06 | (2006.01) | |

(52) U.S. Cl.
CPC .......... *C09D 183/04* (2013.01); *C08K 5/5415* (2013.01); *C08L 83/04* (2013.01); *C08K 3/36* (2013.01); *C08K 5/0091* (2013.01); *C08K 5/5419* (2013.01); *C08K 5/5435* (2013.01); *C08K 9/06* (2013.01)

(58) Field of Classification Search
None
See application file for complete search history.

(56) References Cited

U.S. PATENT DOCUMENTS

| | | | |
|---|---|---|---|
| 3,274,145 A * | 9/1966 | Dupree | .................. C08L 83/04 524/863 |
| 3,413,242 A | 11/1968 | Roberts et al. | |
| 3,419,593 A | 12/1968 | Willing | |
| 4,087,585 A | 5/1978 | Schulz | |
| 4,766,176 A | 8/1988 | Lee et al. | |
| 4,962,076 A | 10/1990 | Chu et al. | |
| 5,017,654 A | 5/1991 | Togashi et al. | |
| 5,051,455 A | 9/1991 | Chu et al. | |
| 5,194,649 A | 3/1993 | Okawa | |
| 5,248,715 A | 9/1993 | Gray et al. | |
| 5,614,654 A | 3/1997 | Miyake et al. | |
| 5,744,507 A | 4/1998 | Angell et al. | |
| 6,169,142 B1 | 1/2001 | Nakano et al. | |
| 6,495,708 B1 | 12/2002 | Yang et al. | |
| 6,512,037 B1 * | 1/2003 | Ahn | ..................... C08K 5/0091 524/413 |
| 7,777,356 B2 | 8/2010 | Katayama et al. | |
| 7,825,177 B2 | 11/2010 | Hara | |
| 8,258,502 B2 | 9/2012 | Yoshitake et al. | |
| 8,372,927 B2 | 2/2013 | Figueroa et al. | |
| 9,598,576 B2 | 3/2017 | Okawa et al. | |
| 2011/0282086 A1 | 11/2011 | Murakami et al. | |
| 2016/0032060 A1 | 2/2016 | Jiang et al. | |

FOREIGN PATENT DOCUMENTS

| | | | |
|---|---|---|---|
| WO | WO 2015/033979 | * | 3/2015 |
| WO | WO 2015/034029 | * | 3/2015 |

OTHER PUBLICATIONS

D. Ahn, N. E. Shephard, et al., "Thermal Gradient Enabled XPS Analysis of PDMS Elastomer Adhesion to Polycarbonate", Macromolecules, 2007;40:3904-3906.
K.A. Andrianov et al.: "Structure and properties of heterorganic oligomer", Russian Chemical Bulletin, Jun. 1972, vol. 21, Issue 6, pp. 1271-1278.
McNaught. "Compendium of Chemical Terminology, 2nd ed. (the "Gold Book")". Blackwell Scientific Publications, Oxford (2014).
Search report from corresponding Japan 2018-567036 application, dated Jan. 6, 2020.

\* cited by examiner

*Primary Examiner* — Marc S Zimmer

(57) ABSTRACT

A curable formulation containing a metal aprotic organosilanoxide compound of formula (I): $\{R^1\text{—}Si(R^2)(R^3)\text{—}[O\text{—}Si(R^4)(R^5)]_m\text{—}O\}_n\text{-}M^1(\leftarrow L)_o(X^1)p$ (I), wherein $M^1$ is a metal atom Al, Ce, Fe, Sn, Ti, V, or Zr, a polymerizable organosilicon compound, an organosilicon crosslinker for crosslinking the polymerizable organosilicon compound, and a silicon-based adhesion promoter. Also included is a cured product of curing the curable formulation; a manufactured article containing or prepared from the curable formulation or cured product; and methods of making and using the foregoing. The cured product may be free-standing or disposed on a substrate.

12 Claims, No Drawings

FORMULATION CONTAINING A METAL APROTIC ORGANOSILANOXIDE COMPOUND

This application is a U.S. national stage filing under 35 U.S.C. § 371 of PCT Application No. PCT/US17/036276 filed on 7 Jun. 2017, currently pending, which claims the benefit of U.S. Provisional Patent Application No. 62/361,774 filed 13 Jul. 2016 under 35 U.S.C. § 119 (e). PCT Application No. PCT/US17/036276 and U.S. Provisional Patent Application No. 62/361,774 are hereby incorporated by reference.

TECHNICAL FIELD

A curable formulation containing a metal aprotic organosilanoxide compound, a cured product thereof, a manufactured article containing or prepared from the curable formulation or cured product, and methods of making and using them.

BACKGROUND OF THE RELATED ART

Incumbent formulations may undesirably adhere weakly to certain substrate materials, degrade or decompose (e.g., embrittle or discolor), or delaminate from their substrates under harsh environmental conditions such as air, heat, humidity, and/or sunlight. To decrease the frequency or severity of delamination (e.g., bubbling or peeling), some substrates may be pre-processed (e.g., primed or pre-dried) before being adhered. Or an adhesion promoter may be used as a primer on the substrate or as an additive in the formulation. Even so, the formulation may exhibit weak adhesion or short shelf-life when used in demanding applications such as adhesives and pottants for electronic devices, coatings for airbags, encapsulants for light-emitting diodes (LEDs) or photovoltaic cells, and sealants for building and construction.

BRIEF SUMMARY OF THE INVENTION

We (the present inventors) have discovered problems with incumbent formulations. They have cohesive failure temperatures ($T_{CF}$) that are too high (e.g., $T_{CF}$>120 C) and/or shelf-lives that are too short (e.g., days or hours instead of weeks or months). The higher a cohesive failure temperature, the higher the temperature required to cure the formulation, and thus the smaller the manufacturing process window for using the formulation and the fewer the types of thermally sensitive electronic components that could be used with the formulation. If shelf life is too short, a formulation is impractical to use in a manufacturing setting because either the manufacturer would need to constantly make or get in a supply of fresh formulation or would need to store the formulation at low temperature and quickly warm and use it. Our invention provides a technical solution to one or more of the problems associated with incumbent formulations.

This invention generally relates to a curable formulation containing a metal aprotic organosilanoxide compound, a polymerizable organosilicon compound, an organosilicon crosslinker for crosslinking the polymerizable organosilicon compound, and a silicon-based adhesion promoter. Also included is a cured product of curing the curable formulation; a manufactured article containing or prepared from the curable formulation or cured product; and methods of making and using the foregoing. The cured product may be free-standing or disposed on a substrate.

DETAILED DESCRIPTION OF THE INVENTION

The Brief Summary and Abstract are incorporated here by reference. This invention is further described herein in an illustrative manner by disclosing a plurality of representative, non-limiting embodiments and examples. In some embodiments the invention is any one of the following numbered aspects.

Aspect 1. A curable formulation comprising constituents (A), (B), and (C): (A) a metal aprotic organosilanoxide compound; (B) a polymerizable organosilicon compound having on average, per molecule, at least 2 silicon-bonded unsaturated aliphatic groups; (C) an organohydrogensilicon compound having on average, per molecule, at least two silicon-bonded hydrogen atoms; and (D) an organosilicon adhesion promoter containing at least one silicon atom, at least 3 silicon-bonded aprotic leaving groups, and at least one silicon-bonded curable group other than a leaving group; wherein the (A) metal aprotic organosilanoxide compound is of formula (I): $\{R^1\text{—}Si(R^2)(R^3)\text{—}[O\text{—}Si(R^4)(R^5)]_m\text{—}O\}_n\text{-}M^1(\leftarrow L)_o(X^1)_p$ (I), wherein $M^1$ is a metal atom Al, Ce, Fe, Sn, Ti, V, or Zr having a formal positive oxidation state, $\delta^+$, of +1 to +3 for Al, +2 to +4 for Ce, +1 to +6 for Fe, +1 to +4 for Sn, +1 to +4 for Ti, +1 to +5 for V, or +1 to +4 for Zr; subscript n is an integer from 1 to $\delta^+$; subscript o is an integer of 0, 1 or 2; each L independently is an aprotic Lewis base; subscript p=($\delta^+$-n); each $X^1$ independently is a halide or an aprotic organoheteryl anion; subscript m is an integer from 3 to 100; each of $R^1$ to $R^5$ is independently is an aprotic ($C_1$-$C_{20}$)hydrocarbyl group or aprotic ($C_2$-$C_{20}$)heterohydrocarbyl group. The ($C_2$-$C_{20}$)heterohydrocarbyl group contains 2 to 20 carbon atoms and at least one heteroatom selected from N, O, S, and P; alternatively N, O, and S; alternatively N and O; alternatively N; alternatively O; alternatively S; alternatively P. Constituents (A) to (D) may be aprotic, that is free of (lack) HO—C, H—N, H—S, and H—P. Constituents (A) and (B), and optionally constituent (D), may also be free of H—Si.

Aspect 2. The curable formulation of aspect 1 wherein none of $R^1$ to $R^5$ contain a carbon-carbon double or triple bond. E.g., none of $R^1$ to $R^5$ is or contains a ($C_2$-$C_{20}$)alkenyl group or a ($C_2$-$C_{20}$)alkynyl group. In some aspects at least one, alternatively each of $R^1$ to $R^5$ independently is an aprotic ($C_1$-$C_{20}$)alkyl group, an aprotic ($C_6$-$C_{20}$)aryl group, or an aprotic ($C_2$-$C_{20}$)heterohydrocarbyl group, none of which contain a carbon-carbon double or triple bond. The aprotic ($C_1$-$C_{20}$)alkyl group includes aprotic ($C_3$-$C_{20}$)cycloalkyl group.

Aspect 3. The curable formulation of aspect 1 wherein at least one, alternatively two or more, alternatively three to ten, of $R^1$ to $R^5$ independently is an aprotic ($C_2$-$C_{20}$)alkenyl group or aprotic ($C_2$-$C_{20}$)alkynyl group, alternatively an aprotic ($C_2$-$C_{20}$)alkenyl group, alternatively an aprotic ($C_2$-$C_6$)alkenyl group. In some aspects any remaining $R^1$ to $R^5$ independently is/are an aprotic ($C_1$-$C_{20}$)alkyl group, an aprotic ($C_6$-$C_{20}$)aryl group, or an aprotic ($C_2$-$C_{20}$)heterohydrocarbyl group.

Aspect 4. The curable formulation of any one of aspects 1 to 3 wherein at least one, alternatively each, $M^1$ is a metal atom Al, Ce, Fe, Sn, Ti, or V; alternatively Al, Ce, Fe, Sn, Ti, or Zr; alternatively Al, Ce, Fe, Sn, V, or Zr; alternatively Al, Ce, Fe, Ti, V, or Zr; alternatively Al, Ce, Sn, Ti, V, or Zr; alternatively Al, Fe, Sn, Ti, V, or Zr; alternatively Ce, Fe, Sn, Ti, V, or Zr. In some aspects at least one, alternatively each, $M^1$ is a metal atom Al, Ce, Fe, or V; alternatively Al, Ce, or Fe; alternatively Al, Ce, or V; alternatively Al, Fe, or V; alternatively Ce, Fe, or V; alternatively Al, alternatively Ce, alternatively Fe, alternatively V. In some aspects at least one, alternatively each, $M^1$ is a metal atom Sn or Ti; alternatively Sn or Zr; alternatively Ti or Zr; alternatively Sn, alternatively Ti, alternatively Zr. In some aspects $M^1$ is Al and $\delta^+$ is +3; alternatively $M^1$ is Ce and $\delta^+$ is +3 or +4; alternatively $M^1$ is Fe and $\delta^+$ is +2 or +3; alternatively $M^1$ is Sn and $\delta^+$ for Sn is +2 or +4; alternatively $M^1$ is Ti and $\delta^+$ for Ti is +4; alternatively $M^1$ is V and $\delta^+$ is +5; alternatively $M^1$ is Zr and $\delta^+$ for Zr is +4.

Aspect 5. The curable formulation of any one of aspects 1-4 wherein subscript n is an integer from 2 to $\delta^+$, alternatively $\delta^+$. Subscript $p=(\delta^+ -n)$.

Aspect 6. The curable formulation of any one of aspects 1-5 wherein subscript o is an integer of 0, alternatively 1 or 2, alternatively 1, alternatively 2. When o is 0, L is absent. When o is 1, one L is present and forms a co-ordinate bond, also called a dative bond, to $M^1$. When o is 2, two independently selected L are present, or one bidentate L is present, and form(s) a total of two co-ordinate bonds to $M^1$. The aprotic Lewis base for L is a neutral, electron pair-donor compound having a molecular weight of from 50 to 500 grams per mole (g/mol) and independently may be selected from an alkene, an alkyne, a tertiary amine of formula $R_3N$, a carboxylic ester of formula $RCO_2R$, an ether of formula ROR, a ketone of formula $RC(=O)R$, a thioether of formula RSR, a trihydrocarbylphosphine of formula $(R)_3P$, or corresponding difunctional analogs thereof such as diamines, dicarboxylic esters, diethers, diketones, dithioethers, or diphosphines. Each R may be independently unsubstituted alkyl or aryl.

Aspect 7. The curable formulation of any one of aspects 1-6 wherein subscript m is an integer from 3 to 50, alternatively 51 to 100, alternatively 3 to 30, alternatively 3 to 20, alternatively 3 to 10, alternatively 3, alternatively 4, alternatively 5, alternatively 6, alternatively 7, alternatively 8, alternatively 9, alternatively 10, alternatively m is an integer selected from all but one of 3 to 100. If m would be 1 or 2 or >100, the metal aprotic organosilanoxide compound of formula (I) may exhibit weak adhesion promoting or adhesion co-promoting effects; impart undesirable physical properties to a curable formulation (e.g., decrease dynamic viscosity too much or be too volatile if m is 1 or 2 or increase dynamic viscosity too much or bury the favorable effect of $M^1$ if m is >100).

Aspect 8. The curable formulation of any one of aspects 1-7 wherein each $X^1$ independently is a halide, alternatively an aprotic organoheteryl anion. The halide may be fluoride, chloride, bromide, or iodide; alternatively fluoride, chloride, or bromide; alternatively fluoride or chloride; alternatively fluoride; alternatively chloride. The aprotic organoheteryl anion may be selected from an alkoxide (i.e., $R^XO^-$), a carboxylate (i.e., $R^XC(=O)O^-$), an oximate (i.e., $R^X_2C=NO^-$), a secondary amino ($R^X_2N-$), or a trihydrocarbylsilanoxide (i.e., $R^X_3SiO^-$). Each $R^X$ independently is an aprotic $(C_1-C_{20})$hydrocarbyl selected from a $(C_1-C_{20})$alkyl, $(C_2-C_{20})$alkenyl, or $(C_6-C_{20})$aryl; alternatively a $(C_1-C_6)$alkyl or $(C_2-C_6)$alkenyl; alternatively $(C_1-C_6)$alkyl; alternatively methyl, ethyl, or phenyl.

Aspect 9. The curable formulation of any one of aspects 1-8 characterized by a concentration of the (A) metal aprotic organosilanoxide compound of formula (I) therein of 0.01 to 10 weight percent (wt %), alternatively 0.1 to 10 wt %, alternatively 0.10 to 5 wt %, alternatively 0.9 to 3 wt % of the total weight of the curable formulation.

Aspect 10. The curable formulation of any one of aspects 1-9 wherein the (B) polymerizable organosilicon compound is selected from an organosilane having on average, per molecule, 1 silicon atom and at least 2 unsaturated aliphatic groups; an oligoorganosiloxane having on average, per molecule, from 2 to 4 silicon atoms and at least 2 unsaturated aliphatic groups; a polyorganosiloxane having on average, per molecule, 5 or more silicon atoms and at least 2 unsaturated aliphatic groups; and a combination of any two or more thereof. The constituent (B) may be aprotic.

Aspect 11. The curable formulation of any one of aspects 1-10 wherein the (C) organohydrogensilicon compound has on average, per molecule, from 1 to 100 silicon atoms and/or at least 2, alternatively at least 2.2 silicon-bonded hydrogen atoms.

Aspect 12. The curable formulation of any one of aspects 1-11 wherein in the (D) organosilicon adhesion promoter each silicon-bonded aprotic leaving group is independently a silicon-bonded aprotic alkoxy group, a silicon-bonded aprotic aliphatic carboxy group, a silicon-bonded aprotic dialkylamino group, a silicon-bonded halogen, or a silicon-bonded aprotic oximo group; and/or each silicon-bonded curable group other than a leaving group is independently an epoxy-functional hydrocarbyl group, a monovalent unsaturated aliphatic group that is free of an oxo (i.e., $=O$) group, a monovalent unsaturated aliphatic carboxylic ester group, a monovalent isocyanate group, a monovalent aldehydic group (i.e., $-C(=O)H$), or a hybrid group of any two or more thereof. In some aspects the (D) organosilicon adhesion promoter is the monovalent unsaturated aliphatic carboxylic ester group, which is a monovalent (meth)acrylate group.

Aspect 13. The curable formulation of any one of aspects 1-12 further comprising at least one additional constituent other than the constituents (A) to (D). Each additional constituent is optional and independently may be any one or more of constituents (E) to (J): (E) a cure agent; (F) an inhibitor of a hydrosilylation catalyst; (G) a filler; (H) a treating agent for treating the (G) filler; (I) a vehicle; (J) a colorant. The total concentration of constituents (A) to (D), plus any of the optional constituents (E) to (J), plus any other optional constituents described later, equals 100 wt % of the curable formulation. The constituents (E) to (K) may be aprotic, alternatively protic.

Aspect 14. A method of making the curable formulation of any one of aspects 1-13, the method comprising contacting the constituents (A) to (D) and, optionally, the at least one additional constituent (E) to (K) to give the curable formulation.

Aspect 15. A manufactured article comprising the curable formulation of any one of aspects 1-13 and a substrate in contact therewith.

Aspect 16. A cured product of curing the curable formulation of any one of aspects 1-13. In some aspects the curable formulation of any one of aspects 1-13 is curable to the cured product, and the cured product is characterized by a cohesive failure temperature $(T_{CF}) \leq 120°$ C., alternatively $T_{CF} < 120°$ C., alternatively $T_{CF} \leq 110°$ C., alternatively $T_{CF} < 110°$ C., alternatively $T_{CF} < 100°$ C., alternatively $T_{CF}$ from 90° to <100° C. In some aspects the curable formulation of any one of aspects 1-13 is curable to the cured product, and the cured product is characterized by a lack of bubbling. The bubbling may be measured using the Thermal Gradient Adhesion Test Method described later. The $T_{CF}$ may be measured using the 90° Peel Adhesion Test Method described later.

Aspect 17. A method of making the cured product of aspect 16, the method comprising subjecting the curable formulation to a cure temperature from 30° to 250° C. to give the cured product. In some aspects the cure temperature is from 50° to 200° C., alternatively from 70° to 180° C., alternatively from 80° to 140° C., alternatively from 85° to 120° C.

Aspect 18. A manufactured article comprising the cured product of aspect 16.

Aspect 19. The manufactured article of aspect 18 further comprising a substrate in contact with the cured product. In some aspects the cured product is adhered to the substrate.

Each molecule of the metal aprotic organosilanoxide compound is composed of at least one metal atom and at least one aprotic organosilanoxide ligand. The metal atom may be aluminum, cerium, iron, tin, titanium, vanadium, zirconium, or a combination of any two or more thereof. The aprotic organosilanoxide ligand may be an anion that is a conjugate base form of an organosilanol and contains on average, per aprotic organosilanoxide ligand, at least one anionic functional group, Si—O⁻. The aprotic organosilanoxide ligand is free of —OH, —NH, —Sh, —PH, and optionally, SiH groups. The polymerizable organosilicon compound may have at least 1, alternatively 2 or more curable groups and may be an organosilicon monomer, organosilicon prepolymer or curable organosilicon polymer. The organosilicon crosslinker may be compound having on average per molecule at least two functional groups that are reactive with the curable groups of the polymerizable organosilicon compound. The silicon-based adhesion promoter may be a compound having, per molecule, at least one silicon-bonded aprotic leaving group and at least one silicon-bonded aprotic curable group, which is different in structure than the silicon-bonded aprotic leaving group. Each of the metal aprotic organosilanoxide compound, polymerizable organosilicon compound, organosilicon crosslinker, and silicon-based adhesion promoter is a distinct compound having a different structure than the structures of the others. The substrate may be any host material configured in any shape. For example, the host material may be a carbon, a ceramic, a metal or metal alloy, an organic or inorganic polymer, or a silicate glass. The configuration may be regularly or irregularly shaped; symmetrical or asymmetrical; solid core or hollow core; (semi)porous or nonporous; a cylinder, a rod, a particulate solid, a hollow sphere, or a sheet or board. The curable formulation and cured product have a variety of uses including as an adhesive, coating, elastomer, encapsulant, pottant, or sealant. The curable formulation and cured product may be used in diverse applications in industries such as building, construction, consumer products, electronics, energy, infrastructure, lighting, packaging, telecommunications, and transportation.

Constituent (A): The Metal Aprotic Organosilanoxide Compound of Formula (I)

The (A) metal aprotic organosilanoxide compound of formula (I) may be a molecule, or a collection of molecules. Each metal atom of the metal aprotic organosilanoxide compound of formula (I) independently has a formal positive oxidation state, $\delta^+$, which reflects that metal atom's known positive oxidation states, which are described above. Each anionic functional group, Si—O⁻, of the aprotic organosilanoxide ligand has a formal negative oxidation state, $\delta^-$, equal to −1, and the aprotic organosilanoxide ligand has a total formal negative oxidation state, $\delta^-$, equal to −y, wherein y is an integer equal to the total number of anionic functional groups, Si—O⁻, per aprotic organosilanoxide ligand. In some aspects there is one anionic functional group, Si—O⁻, per aprotic organosilanoxide ligand, i.e., per molecular anion, and $\delta^-=-y=-1$. In some embodiments, $(-y*-1)=\delta^+$ of the metal atom, wherein * is a multiplication symbol, and the metal aprotic organosilanoxide compound of formula (I) is free of other anionic ligands. In other embodiments, $(-y*-1)<\delta^+$ of the metal atom, and the metal aprotic organosilanoxide compound of formula (I) further contains p additional anionic ligands independently selected from halide and an aprotic organoheteryl anion, wherein $p+(-y*-1)=\delta^+$.

The (A) metal aprotic organosilanoxide compound of formula (I) includes solvates thereof. The solvate may be defined as being a metal aprotic organosilanoxide compound of formula (I) as described except further comprising an aprotic organic solvent molecule. The solvent molecule may contain at least one heteroatom independently selected from N, O, and S. Examples of suitable organic solvents are such as carboxylic esters, ethers, and ketones.

The (A) metal aprotic organosilanoxide compound of formula (I) may be characterized by a concentration of the metal and/or aprotic ($C_2$-$C_{20}$)alkenyl group and/or aprotic ($C_2$-$C_{20}$)alkynyl group therein. In some embodiments (e.g., Aspect 2) the total concentration of the aprotic ($C_2$-$C_{20}$) alkenyl groups and aprotic ($C_2$-$C_{20}$)alkynyl groups in constituent (A) is 0 millimoles per gram of constituent (A) (mmol/g), i.e., 0 wt %. In other embodiments (e.g., Aspect 3) the total concentration of the aprotic ($C_2$-$C_{20}$)alkenyl groups and aprotic ($C_2$-$C_{20}$)alkynyl groups in constituent (A) is from >0 to 10 mmol/g, alternatively from >0 to 5 mmol/g, alternatively from 0.5 to 5 mmol/g, alternatively from 1.0 to 4.0 mmol/g. Alternatively or additionally, the concentration of the metal in the metal aprotic organosilanoxide compound of formula (I) may be 0.01 to 100 mmol/g of the metal aprotic organosilanoxide compound of formula (I), alternatively 0.01 to 50 mmol/g, alternatively 0.020 to 20 mmol/g, alternatively 0.050 to 10 mmol/g, alternatively 0.10 to 5 mmol/g, alternatively 0.15 to 5 mmol/g of the metal aprotic organosilanoxide compound of formula (I). The mmol/g metal concentration may be determined by tracking amounts of constituents added to prepare the metal aprotic organosilanoxide compound of formula (I). Alternatively or additionally, the metal aprotic organosilanoxide compound of formula (I) may be characterized by a molar ratio of the number of moles of the aprotic ($C_2$-$C_{20}$)alkenyl groups and/or aprotic ($C_2$-$C_{20}$)alkynyl groups to the number of moles of the metal. The molar ratio may be abbreviated as "Unsub/Met" wherein Unsub" is the total number of moles of aprotic ($C_2$-$C_{20}$)alkenyl groups and aprotic ($C_2$-$C_{20}$) alkynyl groups and "Met" is the number of moles of metal atoms. In some embodiments (e.g., Aspect 2) the Unsub/Met molar ratio is 0. In other embodiments (e.g., Aspect 3) the Unsub/Met is from 1 to $2\delta^+$, alternatively from 1 to $\delta^+$, alternatively 1, alternatively 2, alternatively 3.

Examples of suitable aprotic ($C_2$-$C_{20}$)alkenyl groups are aprotic ($C_2$-$C_{10}$)alkenyl, aprotic ($C_2$-$C_6$)alkenyl, unsubstituted ($C_2$-$C_6$)alkenyl, vinyl, allyl, 1-buten-1-yl, 1-buten-4-yl, and 1-hexen-6-yl.

Examples of suitable aprotic ($C_2$-$C_{20}$)alkynyl groups are aprotic ($C_2$-$C_{10}$)alkynyl, aprotic ($C_2$-$C_6$)alkynyl, unsubstituted ($C_2$-$C_6$)alkynyl, acetylenyl, propargyl, 1-butyn-1-yl, 1-butyn-4-yl, and 1-hexyn-6-yl.

Examples of suitable aprotic $(C_1-C_{20})$hydrocarbyl groups are aprotic $(C_2-C_{20})$alkenyl; aprotic $(C_2-C_{20})$alkynyl; aprotic $(C_1-C_{10})$hydrocarbyl; aprotic $(C_1-C_{10})$alkyl; aprotic $(C_3-C_{10})$cycloalkyl; aprotic $(C_6-C_{10})$aryl; unsubstituted $(C_1-C_{10})$alkyl; unsubstituted $(C_3-C_{10})$cycloalkyl; unsubstituted $(C_6-C_{10})$aryl; methyl; ethyl; propyl; 1-methylethyl; butyl; 1-methylpropyl; 2-methylpropyl; 1,1-dimethylethyl; and phenyl.

Examples of suitable aprotic $(C_2-C_{20})$heterohydrocarbyl groups are aprotic $(C_2-C_{10})$heterohydrocarbyl; aprotic $(C_2-C_6)$heterohydrocarbyl; aprotic $(C_2-C_6)$heteroalkyl; aprotic $(C_2-C_6)$heterocycloalkyl; aprotic $(C_2-C_6)$heteroaryl; unsubstituted $(C_2-C_6)$heteroalkyl; unsubstituted $(C_2-C_6)$heterocycloalkyl; unsubstituted $(C_2-C_6)$heteroaryl; 1-methoxyethyl; oxiranyl; piperidin-1-yl; thiazolyl; and pyridinyl.

Any of the foregoing $R^1$ to $R^5$ and $R^X$ groups (collectively, "R") may be unsubstituted or substituted with one or more aprotic substituents independently selected from: halo, unsubstituted or fluoro-substituted $(C_1-C_6)$alkyl, unsubstituted or fluoro-substituted $(C_1-C_6)$alkoxy, unsubstituted or fluoro-substituted $(C_1-C_6)$mercapto, oxo (=O; on alkyl groups), unsubstituted or fluoro-substituted phenyl, unsubstituted or fluoro-substituted $(C_1-C_6)$acyl, unsubstituted or fluoro-substituted $(C_1-C_6)$carboxy, unsubstituted or fluoro-substituted $(C_1-C_6)$alkylOC(=O)—, unsubstituted or fluoro-substituted $(C_2-C_6)$epoxy, unsubstituted di$((C_1-C_6)$alkyl)amino, and nitrile (—CN). The substituents may be free of (lack) a carbon-carbon double or triple bond. Halo is F, Cl, Br, or I; alternatively F, Cl, or Br; alternatively F or O; alternatively F; alternatively Cl. When there are two or more substituents in a particular "R" group, the number of substituents is from 2 to per substitution. Typically, per substitution is limited to halo substituents, e.g., trifluoromethyl, trifluoromethoxy, or pentachloroethyl. Typically, the maximum number of non-halo substituents in a particular "R" group is equal to the number of carbon atoms of the corresponding unsubstituted version of that "R" group. For example, a substituted $(C_6)$hydrocarbyl group may contain at most six substituents, each independently selected as described above.

Fluoro-substituents in any one or more of the $R^1$ to $R^5$ and $R^X$ groups may enhance the shelf-life stability at 25° C. of the metal aprotic organosilanoxide compound of formula (I). Alternatively, unsubstituted di$((C_1-C_6)$alkyl)amino substituents in any one or more of the $R^1$ to $R^5$ and $R^X$ groups may decrease the shelf-life stability at 25° C. of the metal aprotic organosilanoxide compound of formula (I). In some embodiments the unsubstituted di$((C_1-C_6)$alkyl)amino substituents may enable gelation of the collection of molecules of the substituted metal aprotic organosilanoxide compound of formula (I) containing same. Gelation may be desirable in applications in which gels may be employed such as in priming a surface of a substrate or in forming a thermal gel for use as a thermal interface material. In applications where gelation is undesirable, or for enabling extended storage times, the metal aprotic organosilanoxide compound of formula (I) containing the unsubstituted di$((C_1-C_6)$alkyl)amino substituent(s) may be diluted in a solvent, thereby inhibiting or preventing gelation.

The (A) metal aprotic organosilanoxide compound of formula (I) is different than any other constituent of the curable formulation in structure; phase; function; metal content, if any; silicon content, if any; proticity; or a combination of any two or more thereof. The (A) metal aprotic organosilanoxide compound of formula (I) and the curable formulation containing same differ from any non-invention compound, mixture, or reaction product of an organosiloxane and a metal-containing ingredient (e.g., a metal-containing catalyst) in terms of composition, metal atom concentration, structure, or function. This is so even wherein the metal of the metal-containing ingredient is the same as $M^1$. For example, the curable formulation may contain greater concentration of the metal $M^1$ than the amount of the metal of the non-invention mixture/product. Additionally or alternatively, the present metal aprotic organosilanoxide compound of formula (I) and/or its aprotic organosilanoxide ligand component may have a different structure than the structure of the non-invention metal-containing ingredient or in situ formed components of the non-invention mixture/product. Additionally or alternatively, the present metal aprotic organosilanoxide compound of formula (I) may function in the curable formulation as an adhesion promoter and/or an adhesion co-promoter, whereas the non-invention metal-containing ingredient may function as a curing catalyst or by-stander constituent of the non-invention mixture/product. The metal aprotic organosilanoxide compound of formula (I) may function as an adhesion co-promoter by enhancing the adhesion-promoting effect of the constituent (D) organosilicon adhesion promoter, so as to synergistically increase adhesion of the cured product, formed from the curable formulation by curing, to a substrate.

In some embodiments the metal aprotic organosilanoxide compound of formula (I) may be any one of, or a combination of any two of, the Preparations 1A, 1AA, 1B to 1G, 2A to 2E, 3A to 3E, and 4A described later. In some embodiments the metal aprotic organosilanoxide compound of formula (I) may be any one of, or a combination of any two of, the Preparations 3A to 3E described later. In some embodiments the metal aprotic organosilanoxide compound of formula (I) may be any one of, or a combination of any two of, the Preparations 1A, 1AA, 1B to 1G, 2A to 2E, and 4A described later.

Uses of the (A) metal aprotic organosilanoxide compound of formula (I) include as an adhesion promoter, or as an adhesion co-promoter with constituent (D), during curing of the curable formulation. The (A) metal aprotic organosilanoxide compound of formula (I) may have alternative or additional uses in the curable formulation. The (A) metal aprotic organosilanoxide compound of formula (I) is typically present in the curable formulation at a concentration from 0.01 to 49.9 weight percent (wt %). The particular concentration may be chosen depending upon the intended use of the curable formulation. In some aspects the concentration is 31 to 49 wt %, alternatively 11 to 30 wt %, alternatively 0.01 to 10 wt %, all based on total weight of the curable formulation. When the metal aprotic organosilanoxide compound of formula (I) is used in the curable formulation as an adhesion promoter, or as an adhesion co-promoter in conjunction with the constituent (D), the concentration of (A) may be from 0.01 to 10 wt %, alternatively from 0.02 to 9 wt %, alternatively from 0.1 to 8 wt %, alternatively from 0.1 to 5 wt %, alternatively from 0.1 to 4 wt %, alternatively from 0.01 to 3 wt %, alternatively from 0.1 to 3 wt %, alternatively from 0.5 to 3 wt %. Advantageously, the (A) metal aprotic organosilanoxide compound of formula (I) may enhance the adhesion promoting effect of the (D) organosilicon adhesion promoter.

The metal aprotic organosilanoxide compound of formula (I) may be made by a method comprising contacting n mole equivalents of an organosilanol compound of formula (II): $\{R^1$—Si$(R^2)(R^3)$—[O—Si$(R^4)(R^5)]_m$—OH (II), wherein subscripts m and n and groups $R^1$ to $R^5$ are as defined for formula (I), with a metal salt reactant of formula (A):

$M^1(X^1)_q$ (A), or a solvate thereof, wherein $M^1$ is a metal atom Al, Ce, Fe, Sn, Ti, V, or Zr having a formal positive oxidation state, $\delta^+$, of +1 to +3 for Al, +2 to +4 for Ce, +1 to +6 for Fe, +1 to +4 for Sn, +1 to +4 for Ti, +1 to +5 for V, or +1 to +4 for Zr, wherein the metal atom of $M^1$ of formula (A) is the same as the metal atom of $M^1$ of formula (I) and wherein the formal positive oxidation state, $\delta^+$, of $M^1$ in formula (A) is the same as or different than the formal positive oxidation state, $\delta^+$, of $M^1$ in formula (I); optionally in the presence of L, an aprotic Lewis base to give the metal aprotic organosilanoxide compound of formula (I), wherein subscript q=the formal positive oxidation state, $\delta^+$, of $M^1$ in formula (A) and each $X^1$ independently is a halide or an aprotic organoheteryl anion, wherein each $X^1$ in formula (A) independently is the same as or different than $X^1$ in formula (I).

The organosilanol compound of formula (II) may be obtained from commercial sources or synthesized by selectively endcapping the organosilane-diol compound of formula (IV): $H-[O-Si(R^4)(R^5)]_m-OH$ (IV), wherein subscript m and groups $R^4-R^5$ are as defined for formula (IV). The organosilane-diol compound of formula (IV) has on average, per molecule, one SiOH group at each terminus, and may be selectively endcapped by contacting it with one molar equivalent of an endcapper compound of formula $R^1-Si(R^2)(R^3)-X^1$, wherein $R^1-R^3$ are as defined for formula (I) and $X^1$ independently is a halide or an aprotic organoheteryl anion. The aprotic organoheteryl anion may be as defined above, e.g., an alkoxide (i.e., $R^XO^-$), a carboxylate (i.e., $R^XC(=O)O^-$), an oximate (i.e., $R^X{}_2C=NO^-$), a secondary amino ($R^X{}_2N-$), or a trihydrocarbylsilanoxide (i.e., $R^X{}_3SiO^-$). Each $R^X$ independently is an aprotic $(C_1-C_{20})$hydrocarbyl selected from a $(C_1-C_{20})$alkyl, $(C_2-C_{20})$alkenyl, or $(C_6-C_{20})$aryl; alternatively a $(C_1-C_6)$alkyl or $(C_2-C_6)$alkenyl; alternatively $(C_1-C_6)$alkyl; alternatively methyl, ethyl, or phenyl. Endcapping methods are well-known in the art.

The organosilane-diol compound of formula (IV): $H-[O-Si(R^4)(R^5)]_m-OH$ (IV) may be obtained from commercial sources or made by methods that are well-known in the art. For example, by contacting, under condensation reaction conditions, water with a diorganosilane of formula (B): $(X^1)_2SiR^4R^5$ (B), wherein groups $R^4$ and $R^5$ are as defined for formula (IV) and group $X^1$ is independently a halide or an aprotic organoheteryl anion as defined above.

In some embodiments the curable formulation includes the dimetal organosilan-dioxide of formula (VI): $R^6-OM^1-[O-Si(R^4)(R^5)]_m-O-M^1O-R^6$ (VI), wherein each $R^6$ independently is $\{R^1-Si(R^2)(R^3)-$ or $X^1$, and subscript m, metal $M^1$, and groups $R^1-R^5$ and $X^1$ are independently as defined for formula (I). The curable formulation may include the dimetal organosilan-dioxide of formula (VI) instead of, alternatively in addition to, the metal aprotic organosilanoxide compound of formula (I).

In some embodiments the invention includes the metal organosilan-dioxide of formula (VII): $c[-[*O-Si(R^4)(R^5)]_m-O-M^{1*}]O-R^6$ (VII), wherein "c[* ... *]" indicates a cyclic group bonding the *O to the $M^{1*}$; each $R^6$ independently is $\{R^1-Si(R^2)(R^3)-$ or $X^1$, and subscript m, metal $M^1$, and groups $R^1-R^5$ and $X^1$ are independently as defined for formula (I). The curable formulation may include the dimetal organosilan-dioxide of formula (VII) instead of, alternatively in addition to, the metal aprotic organosilanoxide compound of formula (I).

When the formal positive oxidation state, $\delta^+$, of $M^1$ in formula (A) is different than the formal positive oxidation state, $\delta^+$, of $M^1$ in formula (I), the method further comprises a reduction or oxidation reaction step, as the case may be, to convert the formal positive oxidation state, $\delta^+$, of the metal, $M^1$, of the metal salt reactant of formula (A) to the formal positive oxidation state, $\delta^+$, of the metal, $M^1$, of the metal organosilanoxide compound of formula (I). The reduction or oxidation reaction step may further include a reductant or oxidant, respectively, to effect the reduction or oxidation. The reductant is used when the $\delta^+$ of $M^1$ in formula (A) is greater than the $\delta^+$ of $M^1$ in formula (I). The oxidant is used when the $\delta^+$ of $M^1$ in formula (A) is less than the $\delta^+$ of $M^1$ in formula (I). The reduction or oxidation reaction step may occur before, during, and/or after the contacting step. The reduction or oxidation reaction may occur in the same or different reactor vessel as the contacting step.

When the formal positive oxidation state, $\delta^+$, of $M^1$ in formula (A) is the same as the formal positive oxidation state, $\delta^+$, of $M^1$ in formula (I), the method may not further comprise a reduction or oxidation step and may not further comprise a reductant or oxidant. In some embodiments each $X^1$ in formula (A) is the same as $X^1$ in formula (I). In some embodiments the $\delta^+$ of $M^1$ in formula (A) is the same as the $\delta^+$ of $M^1$ in formula (I); the method does not further comprise a reduction or oxidation step and does not further comprise a reductant or oxidant; and each $X^1$ is the same in formulas (A) and (I). In some embodiments each $X^1$ is a halide, alternatively an aprotic organoheteryl anion, alternatively an alkoxide.

The method of making the metal aprotic organosilanoxide compound of formula (I) may comprise contacting an organosilanol precursor compound (e.g., the organosilanol of formula (II) described above) with a metal salt reactant that is free of silicon (e.g., the metal salt reactant of formula (A) described above) to give a product reaction mixture comprising the metal aprotic organosilanoxide compound of formula (I) and a by-product, described below. The metal salt reactant (e.g., the metal salt reactant of formula (A) described above) may be obtained from commercial sources or synthesized by any suitable method, many of which are well-known in the art.

The contacting step prepares the metal aprotic organosilanoxide compound of formula (I) directly from the organosilanol precursor compound and the metal salt reactant without going through an intermediate metal aprotic organosilanoxide ligand complex wherein the metal is not the same metal as $M^1$ in formula (I). When $X^1$ in formula (A) independently is a halide, the contacting step and the product reaction mixture further comprises a metal non-nucleophilic base, such as an organoheteryl-metal complex wherein the metal is the same metal as $M^1$ in formula (I); and the product reaction mixture further comprises a second by-product. The by-products are an organoheteryl-H corresponding to the organoheteryl-metal complex and a metal halide salt corresponding to the halide. When the organoheteryl anion is an alkoxide and the halide is a chloride, the by-products are an alcohol corresponding to the alkoxide and a metal chloride corresponding to the halide.

Alternatively, when $X^1$ in formula (A) independently is the aprotic organoheteryl anion, the metal non-nucleophilic base, such as an organoheteryl anion metal salt wherein the metal is the same metal as $M^1$ in formula (I), may be omitted from the contacting step, and thus from the resulting product reaction mixture. For example, when in formula (A) $X^1$ independently is an alkoxide, the method of making the metal aprotic organosilanoxide compound of formula (I) may comprise contacting the organosilanol precursor compound (e.g., the organosilanol of formula (II) described above) with a metal alkoxide salt reactant that is free of silicon (e.g., the metal salt reactant of formula (A) described above wherein each $X^1$ independently is an alkoxide) to give a product reaction mixture comprising the metal aprotic organosilanoxide compound of formula (I) and an alcohol by-product corresponding to the alkoxide.

The product reaction mixture that contains the metal aprotic organosilanoxide compound of formula (I) and by-product(s) may be used "as is", i.e., without further processing, e.g., combined with the polymerizable compound and, optionally, the at least one additional constituent to give the curable formulation. Alternatively, the product reaction mixture may be further processed. Further processing of the product reaction mixture may comprise removing the by-product(s) therefrom, removing any solvent therefrom, isolating and/or purifying the metal aprotic organosilanoxide compound of formula (I) therefrom, and/or solvent-exchanging the solvent of the product reaction mixture for (replacing with) another solvent. The by-product that is the organoheteryl-H, e.g., the alcohol, and the solvent may be removed from the product reaction mixture by any suitable technique such as evaporating, distilling, stripping, blotting, decanting, triturating, extracting, or a combination of any two or more thereof. The by-product that is the metal halide may be removed from the product reaction mixture by any suitable technique such as filtering or centrifuging/decanting. The isolating and/or purifying may comprise precipitating or filtering the metal aprotic organosilanoxide compound of formula (I) therefrom, alternatively precipitating or filtering the by-product therefrom. The precipitating may be performed by cooling the product reaction mixture and/or by adding to the reaction mixture a desolubilizing additive such as an organic liquid in which the would-be precipitate is insoluble. The contacting step and further processing steps may be carried out using conventional techniques for air and moisture sensitive materials such as vacuum-gas manifold equipment (so-called Schlenk line techniques), cannula transfers, inert gas atmospheres, anhydrous solvents, and the like. These techniques are well known.

In an alternative embodiment, the method of making the metal aprotic organosilanoxide compound of formula (I) may comprise going through an intermediate metal aprotic organosilanoxide ligand complex wherein the metal is not Al, Ce, Fe, Sn, Ti, V, or Zr. In such embodiments, the method comprises preliminarily contacting the organosilanol precursor compound (e.g., the organosilanol of formula (II) described above) with an effective amount of a Group 1 metal or Group 2 hemi-metal non-nucleophilic base such as a Group 1 metal or Group 2 hemi-metal alkoxide (e.g., potassium tertiary-butoxide), a Group 1 metal or Group 2 hemi-metal secondary amide (e.g., lithium diisopropylamide), a Group 1 metal or Group 2 hemi-metal carbanion (e.g., tertiary-butyl lithium), a Group 1 metal or Group 2 hemi-metal hydride (e.g., NaH or $CaH_2$), a Grignard reagent (e.g., ethyl magnesium bromide), or a Group 1 metal or Group 2 hemi-metal disilazane (e.g., potassium bis(trimethylsilyl) amide) to give an intermediate reaction mixture comprising a metal aprotic organosilanoxide ligand intermediate and an intermediate by-product. The intermediate by-product is an alcohol corresponding to the alkoxide, a secondary amine corresponding to the secondary amide, a hydrocarbon corresponding to the carbanion, molecular hydrogen, a hydrocarbon (e.g., ethane) corresponding to the Grignard reagent, or a bis(trialkylsilyl)amine corresponding to the disilazane. The Group 1 metal may be Li, Na, K, or Cs; alternatively Li, Na, or K; alternatively Li, alternatively Na, alternatively K. The Group 2 hemi metal may be hemi-Be, hemi-Mg, hemi-Ca, or hemi-Ba; alternatively hemi-Mg or hemi-Ca (i.e., 0.5 Mg or 0.5 Ca). After the preliminary contacting step, the contacting step described in the preceding paragraphs is performed except the metal aprotic organosilanoxide ligand intermediate is used in place of the organosilanol precursor compound.

The intermediate reaction mixture that contains the metal aprotic organosilanoxide ligand intermediate and an intermediate by-product may be used "as is", i.e., without further processing, or may be further processed. Further processing of the intermediate reaction mixture may comprise may comprise isolating and/or purifying the metal aprotic organosilanoxide ligand intermediate therefrom, or concentrating or solvent-exchanging the intermediate reaction mixture; all prior to the next contacting step. The isolating and/or purifying may comprise precipitating or filtering the metal aprotic organosilanoxide ligand intermediate therefrom, alternatively precipitating or filtering the by-product therefrom. The precipitating may be performed by cooling the intermediate reaction mixture and/or by adding to the intermediate reaction mixture a desolubilizing additive such as an organic liquid in which the would-be precipitate is insoluble. The preliminary contacting step and further processing steps may be carried out using conventional techniques for air and moisture sensitive materials such as vacuum-gas manifold equipment (so-called Schlenk line techniques), cannula transfers, inert gas atmospheres, anhydrous solvents, and the like.

The contacting steps described herein independently are typically performed in a solvent such as an organic solvent or a polydimethylsiloxane fluid, and so the reaction mixtures typically further comprises the solvent. Examples of suitable aprotic organic solvents are hydrocarbons such as isoalkanes, toluene, and xylenes; ethers such as tetrahydrofuran and dioxane; alcohols such as 2-propanol and 1-butanol; ketones such as methyl ethyl ketone; and pyridine. In some aspects the solvent is aprotic, alternatively protic. The contacting steps may be conducted at any suitable temperatures such as from −50° to 150° C. for any suitable period of time such as from 1 minute to 1 day. Generally, the higher the contacting temperature the shorter the period of time.

Constituent (B): Polymerizable Organosilicon Compound

The (B) polymerizable organosilicon compound is addition curable, which includes hydrosilylation curable or radical curable. The (B) polymerizable organosilicon compound that is radical curable cures by forming carbon-carbon bonds between different ones of the unsaturated aliphatic groups (e.g., alkynyl groups and/or alkenyl groups). The (B) polymerizable organosilicon compound that is hydrosilylation curable cures by forming carbon-silicon bonds between one of the unsaturated aliphatic groups of (B) polymerizable organosilicon compound and the (C) organohydrogensilicon compound. The (B) polymerizable organosilicon compound may be an addition curable organosilicon monomer, addition curable organosilicon prepolymer, or addition curable organosilicon polymer. Accordingly, the (B) polymerizable organosilicon compound may be the organosilane having on average, per molecule, 1 silicon atom and at least 2 unsaturated aliphatic groups; alternatively the oligoorganosiloxane having on average, per molecule, from 2 to 4 silicon atoms and at least 2 unsaturated aliphatic groups; alternatively the polyorganosiloxane having on average, per molecule, 5 or more silicon atoms and at least 2 unsaturated aliphatic groups; alternatively the combination of any two or more thereof. Each silicon-bonded unsaturated aliphatic group may be bonded to the same or different silicon atom up to a maximum of four unsaturated aliphatic groups bonded to a same silicon atom. The polymerizable organosilicon compound may be characterized by a molar ratio of moles of silicon-bonded unsaturated aliphatic groups per moles of silicon atoms ("SiUnsat/Si"). In some aspects the SiUnsat/Si molar ratio is from 0.05 to 4, alternatively from 0.1 to 4, alternatively from 0.2 to 2. The polymerizable organosilicon compound is different from the metal aprotic organosilanoxide compound of formula (I) in its composition, structure, curability, or a combination of any two or more thereof. For example, the metal aprotic organosilanoxide compound of formula (I) is not a monomer because subscript m in formula (I) is at least 3. The polymerizable organosilicon compound may be free of (i.e., lack) a metal atom $M^1$. The polymerizable organosilicon compound may be an organosilane monomer, an organosiloxane oligomer or prepolymer, or a curable polyorganosiloxane polymer. The (B) polymerizable organosilicon compound may be a clustered functional polyorganosiloxane, which is known in the art. The (B) polymerizable organosilicon compound may be a bis(vinyldimethylsiloxy)-terminated polydimethylsiloxane. The bis(vinyldimethylsiloxy)-terminated polydimethylsiloxane has D units (i.e., $[(CH_3)_2SiO_{2/2}]$) and terminal $M^{Vi}$ units (i.e., $[(CH_2=CH)(CH_3)_2SiO_{1/2}]$) and may have from 0.05 to 2 wt %, alternatively 0.07 to 1 wt % vinyl (—CH=CH$_2$) groups.

Uses of the (B) polymerizable organosilicon compound include as a matrix precursor, wherein a matrix is formed therefrom during curing of the curable formulation. The matrix may further comprise multivalent crosslinking groups derived from a reaction of constituent (C) with (B) during the curing. Thus, the matrix may be comprised of a network polymer, and the cured product may be comprised of the matrix. The (B) polymerizable organosilicon compound may have additional uses in the curable formulation. The (B) polymerizable organosilicon compound may present in the curable formulation at a concentration of from 5 to 98 wt %, alternatively 10 to 95 wt %, alternatively 10 to 75 wt %, all based on total weight of the curable formulation. Not counting any (H) solvent, the (B) polymerizable organosilicon compound may present in the curable formulation at a concentration of from 35 to 99 wt %, alternatively 40 to 95 wt %, alternatively 50 to 90 wt %, all based on total weight of the curable formulation not counting (I) solvent.

Constituent (C): Organohydrogensilicon Compound

The (C) organohydrogensilicon compound may be characterized by an average number of silicon atoms per molecule of from 1 to 20, alternatively 1 to 10, alternatively 1, alternatively 2 to 4, alternatively 5 to 20, alternatively 11 to 20. The (C) organohydrogensilicon compound may have on average per molecule at least 2.2 silicon-bonded hydrogen atoms, alternatively from 3 to 10 silicon-bonded hydrogen atoms, alternatively from 3 to 6 silicon-bonded hydrogen atoms. The (C) organohydrogensilicon compound may be characterized by a molar ratio of the number of moles of silicon-bonded hydrogen atoms in (C) to the number of moles of silicon-bonded unsaturated aliphatic groups in (B) ("SiH/SiUnsat"). In some embodiments the SiH/SiUnsat molar ratio is from 0.5 to 20, alternatively 1 to 20, alternatively 1 to 10, alternatively 2 to 5. The (C) organohydrogensilicon compound may be a bis(trimethylsiloxy)-terminated poly(dimethyl)(methyl,hydrogen)siloxane, which has D units (i.e., $[(CH_3)_2SiO_{2/2}]$) and $D^H$ units (i.e., $[H(CH_3)SiO_{2/2}]$) and terminal $M^H$ units (i.e., $[(CH_2=CH)(CH_3)_2SiO_{1/2}]$).

Uses of the (C) organohydrogensilicon compound include as a crosslinker for crosslinking the (B) polymerizable organosilicon compound during curing of the curable formulation. The (C) organohydrogensilicon compound may have additional uses in the curable formulation. When the (B) polymerizable organosilicon compound is the organosilane monomer or the organosiloxane oligomer, the (B) polymerizable organosilicon compound may first react in situ to form an intermediate polymerizable reaction product, and then the intermediate polymerizable reaction product may react with the (C) organohydrogensilicon compound in a curing reaction to give the cured product thereof. The (C) organohydrogensilicon compound may present in the curable formulation at a concentration of from 0.1 to 50 wt %, alternatively 1 to 50 wt %, alternatively 5 to 25 wt %, all based on total weight of the curable formulation.

Constituent (D): The Organosilicon Adhesion Promoter

The (D) organosilicon adhesion promoter may be aprotic, alternatively protic. The (D) organosilicon adhesion promoter may have on average per molecule 1 silicon atom, alternatively two silicon atoms, alternatively from 3 to 50 silicon atoms, alternatively 1 to 5 silicon atoms, alternatively 6 to 20 silicon atoms, alternatively 21 to 50 silicon atoms, alternatively 51 to 100 silicon atoms. In some embodiments each silicon-bonded aprotic leaving group is independently an aprotic alkoxy group, an aprotic aliphatic carboxy group, an aprotic dialkylamino group, a halogen, or an aprotic oximo group; alternatively an aprotic alkoxy group, an aprotic aliphatic carboxy group, an aprotic dialkylamino group, a halogen, or an aprotic monovalent urethane group; alternatively an aprotic alkoxy group, an aprotic aliphatic carboxy group, an aprotic dialkylamino group, an aprotic oximo group, or an aprotic monovalent urethane group; alternatively an aprotic alkoxy group, an aprotic aliphatic carboxy group, a halogen, an aprotic oximo group, or an aprotic monovalent urethane group; alternatively an aprotic alkoxy group, an aprotic dialkylamino group, a halogen, an aprotic oximo group, or an aprotic monovalent urethane group; alternatively an aprotic aliphatic carboxy group, an aprotic dialkylamino group, a halogen, an aprotic oximo group, or an aprotic monovalent urethane group; alternatively an aprotic alkoxy group; alternatively an aprotic aliphatic carboxy group; alternatively an aprotic dialkylamino group; alternatively a halogen; alternatively an aprotic oximo group; alternatively an protic monovalent urethane group (e.g., NHC(=O)NH$_2$).

In the (D) organosilicon adhesion promoter, the silicon-bonded aprotic leaving group is a group of formula $Si^a$-LG, wherein $Si^a$ is the silicon atom bearing the aprotic leaving group and LG is the aprotic leaving group. In a condensation reaction the aprotic leaving group (LG group) may be formally displaced by a water molecule or a silicon-bonded hydroxyl group of formula HO—$Si^b$, wherein $Si^b$ is the silicon atom of the silicon-bonded hydroxyl group, wherein $Si^a$ and $Si^b$ are different silicon atoms. The displacement formally yields $Si^a$—OH or H-LG or $Si^a$—O—$Si^b$+H$_2$O, respectively. The silicon-bonded aprotic alkoxy group may be depicted by formula Si—Oalkyl. The silicon-bonded aprotic aliphatic carboxy group may be depicted by formula Si—OC(=O)$R^c$, wherein $R^c$ is H or an aliphatic group; alternatively H or an alkyl group; alternatively an alkyl group; alternatively a cycloalkyl group; alternatively an acyclic alkyl group; alternatively a straight chain alkyl group; alternatively a branched chain alkyl group. The silicon-bonded aprotic dialkylamino group may be depicted by formula Si—N(alkyl)$_2$, wherein each alkyl is the same or different. The silicon-bonded halogen may be depicted by formula Si-halo, wherein halo is F, Cl, Br, I; alternatively F, Cl, or Br; alternatively Cl or Br; alternatively Cl; alternatively Br. The silicon-bonded aprotic oximo group may be depicted by formula Si—ONC(R$^c$)$_2$, wherein each R$^c$ is independently defined above. In some embodiments each silicon-bonded aprotic leaving group is independently an aprotic (C$_1$-C$_6$)alkoxy group, an aprotic (C$_1$-C$_6$)aliphatic carboxy group, an aprotic di((C$_1$-C$_6$)alkyl)amino group, a halogen, or an aprotic (C$_1$-C$_6$)oximo group. In some aspects each aprotic leaving group has from 1 to 6 carbon atoms, alternatively from 1 to 4 carbon atoms; alternatively from 1 to 3 carbon atoms; alternatively from 4 to 6 carbon atoms; alternatively 1 or 2 carbon atoms; alternatively 3 or 4 carbon atoms; alternatively 1 carbon atom, alternatively 2 carbon atoms. In some aspects each aprotic leaving group is an aprotic (C$_1$-C$_6$)alkoxy group; alternatively an aprotic (C$_1$-C$_4$)alkoxy group; alternatively an aprotic (C$_1$-C$_3$)alkoxy group; alternatively an aprotic (C$_1$-C$_2$)alkoxy group; alternatively an aprotic (C$_2$-C$_4$)alkoxy group; alternatively methoxy; alternatively ethoxy; alternatively 1-methylethoxy; alternatively propoxy; alternatively 1,1-dimethylethoxy; alternatively 1-methylpropoxy; alternatively 2-methylpropoxy; alternatively butoxy. Each silicon-bonded aprotic leaving group is different than the silicon-bonded aprotic curable group of component (D) in structure and function.

In the (D) organosilicon adhesion promoter, each silicon-bonded aprotic curable group other than a leaving group may be independently an epoxy-functional hydrocarbyl group, a monovalent unsaturated aliphatic group that is free of an oxo (i.e., =O) group, a monovalent unsaturated aliphatic carboxylic ester group, a monovalent isocyanate group, or a monovalent aldehydic group. Suitable epoxy-functional adhesion promoters for (D) are known in the art and commercially available, see for example, U.S. Pat. Nos. 4,087,585; 5,194,649; 5,248,715; and 5,744,507 (at columns 4-5). Examples of the (D) organosilicon adhesion promoter wherein the silicon-bonded aprotic curable group is the epoxy-functional hydrocarbyl are 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of the (D) organosilicon adhesion promoter wherein the silicon-bonded aprotic curable group is the monovalent unsaturated aliphatic group that is free of an oxo (i.e., =O) group are vinyltrimethoxysilane, allyltrimethoxysilane, allyltriethoxysilane, hexenyltrimethoxysilane, and undecylenyltrimethoxysilane. Examples of the (D) organosilicon adhesion promoter wherein the silicon-bonded aprotic curable group is the monovalent unsaturated aliphatic carboxylic ester group are 3-methacryloyloxypropyl trimethoxysilane, 3-methacryloyloxypropyl 3-acryloyloxypropyl 3-acryloyloxypropyl triethoxysilane, and combinations thereof. Examples of the (D) organosilicon adhesion promoter wherein the silicon-bonded aprotic curable group is the monovalent isocyanate group are 3-isocyanatopropyl triethoxysilane and 2-isocyanatoethyl trimethoxysilane. Examples of the (D) organosilicon adhesion promoter wherein the silicon-bonded aprotic curable group is the monovalent aldehydic group are 3-oxopropyl triethoxysilane, 3-oxopropyl trim ethoxysilane, and 2-oxoethyl trimethoxysilane.

Alternatively, the (D) organosilicon adhesion promoter may be a reaction product of a reaction of a hydroxyl-terminated polyorganosiloxane with an epoxy-functional alkoxysilane, as described above, or a physical blend of the hydroxy-terminated polyorganosiloxane with the epoxy-functional alkoxysilane. Constituent (D) may comprise a combination of an epoxy-functional alkoxysilane and an epoxy-functional siloxane. For example, constituent (D) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Alternatively each silicon-bonded aprotic curable group other than a leaving group in the (D) organosilicon adhesion promoter may be a mercapto-functional hydrocarbyl group. Suitable mercapto-functional hydrocarbyl groups include 3-mercaptopropyl trimethoxysilane. Suitable mercapto-functional D) organosilicon adhesion promoters are disclosed in U.S. Pat. No. 4,962,076.

Uses of the (D) organosilicon adhesion promoter include as an adhesion promoter for enhancing adhesion of the cured product to a substrate. The constituent (D) may have additional uses in the curable formulation. The (D organosilicon adhesion promoter may present in the curable formulation at a concentration of from 0.1 to 10 wt %, alternatively 0.5 to 8 wt %, alternatively 0.5 to 5 wt %, all based on total weight of the curable formulation.

Constituents (E) to (J) are optional. In some embodiments the curable formulation further comprises at least one of constituents (E) to (J). In other embodiments, the curable formulation is free of (lacks) at least one, alternatively each of constituents (E) to (J).

Constituent (E) a cure agent, which is effective for initiating, or enhancing rate of, curing of the curable formulation. The (E) cure agent may be (E1) a hydrosilylation catalyst, (E2) a free radical cure initiator; or (E3) a combination of (E1) and (E2). The (E1) hydrosilylation catalyst may be a metal; a compound or organometallic complex containing the metal; or any combination thereof. Each metal independently may be platinum, rhodium, ruthenium, palladium, osmium, iridium, or any combination of at least two thereof. Typically, the hydrosilylation catalyst is a platinum hydrosilylation catalyst. Examples of suitable platinum hydrosilylation catalysts are complexes of chloroplatinic acid and certain vinyl-containing organosiloxanes in U.S. Pat. No. 3,419,593 such as the complex of a reaction product of chloroplatinic acid and 1,3-diethenyl-1,1,3,3-tetramethyldisiloxane. The hydrosilylation catalyst may be unsupported, alternatively supported (disposed) on a solid support (e.g., particulate carbon, silica, or alumina). The supported hydrosilylation catalyst differs from a catalyst metal-free filler comprising a particulate solid such as particulate carbon, silica, or alumina in at least one feature, structure, function, reactivity or property.

The hydrosilylation catalyst aspect of constituent (E1) may be configured for increased stability during storage of the curable formulation, i.e., before curing thereof. For example, the (E1) hydrosilylation catalyst may be microencapsulated in a thermoplastic resin for increased storage stability. The microencapsulated (E1) hydrosilylation catalyst comprises a core of the (E1) hydrosilylation catalyst surrounded and hermetically covered by a shell of the thermoplastic resin. Typically, the storage of the curable formulation containing the microencapsulated (E1) hydrosilylation catalyst is done at a temperature less than the melting or softening point of the thermoplastic resin. When curing is desired, the microencapsulated (E1) (e.g., see U.S. Pat. Nos. 4,766,176 and 5,017,654) may be heated in the curable formulation above the melting or softening point of the thermoplastic resin, thereby exposing the (E1) hydrosilylation catalyst core to the constituents (A) to (D) of the curable formulation, and catalyzing hydrosilylation curing thereof. Alternatively, the (E1) hydrosilylation catalyst in the curable formulation may be a photoactivatable catalyst for increased storage stability. Examples of photoactivatable catalysts suitable for (E1) are platinum (II) β-diketonate complexes such as platinum (II) bis(2,4-pentanedionate). Typically, storage of the curable formulation containing the photoactivatable catalyst as (E1) is done in absence of light of wavelengths used for photoactivation of the photoactivatable catalyst. For example, the curable formulation containing the photoactivatable catalyst as (E1) may be stored in a container that blocks light at one or more wavelengths of from 150 to 800 nanometers (nm). When curing is desired, the photoactivatable catalyst may be exposed in the curable formulation to ultraviolet radiation having a wavelength of from 150 to 800 nm, thereby activating the photoactivatable catalyst as (E1) in the presence of the constituents (A) to (D) and catalyzing hydrosilylation curing thereof.

The (E2) free radical cure initiator may be any compound that generates a free radical at elevated temperature. The (E2) radical cure initiator may be an organic peroxide such as hydroperoxide, a diacyl peroxide, a ketone peroxide, a peroxyester, a dialkyl peroxide, a peroxydicarbonate, a peroxyketal, a peroxy acid, an acyl alkylsulfonyl peroxide, or an alkyl monoperoxydicarbonate. Specific examples of suitable peroxides include: 2,5-dymethyl-2,5-di(tert-butylperoxy)hexane, benzoyl peroxide; dicumyl peroxide; t-butyl peroxy O-toluate; cyclic peroxyketal; t-butyl hydroperoxide; t-butylperoxypivalate; lauroyl peroxide; t-amyl peroxy 2-ethylhexanoate; vinyltris(t-butyl peroxy)silane; di-t-butyl peroxide; 1,3-bis(t-butylperoxyisoprpyl) benzene; 2,2,4-trimethylpentyl-2-hydroperoxide; and 2,5-bis(t-butylperoxy)-2,5-dimethylhexyne-3-(t-butyl-peroxy)-3,5,5-trimethylhexanoate. The "t-butyl" means tertiary-butyl, i.e., 1,1-dimethylethyl.

When present in the curable formulation, the (E) cure agent may be at a concentration of from 1 to 1,000 parts per million (ppm) based on total weight of the curable formulation. Suitable (E) cure agent may be readily prepared by numerous well-known methods or may be obtained from commercial suppliers such as Dow Corning Corporation or Akzo Nobel.

Constituent (F) an inhibitor of the (E1) hydrosilylation catalyst is effective at 23° C. for inhibiting curing of the curable formulation catalyzed by constituent (E1). The (F) inhibitor may be an inhibitor of a platinum hydrosilylation catalyst. Inhibitors of hydrosilylation catalysts are known. For example, the (F) hydrosilylation catalyst inhibitor may be any one of the compounds described for component j) in US 2016/0032060 A1. Examples of the compounds are ethylenically-unsaturated or aromatically-unsaturated amides, acetylenic compounds, unsaturated hydrocarbon dicarboxylic esters, conjugated ene-ynes, olefinic siloxanes, hydroperoxides, nitriles, diaziridines, carboxylic esters derived from carboxylic acids and unsaturated alcohols, amines, phosphines, sulfur compounds, hydroperoxy compounds, and combinations of any two or more thereof. The (F) inhibitor of the (E1) hydrosilylation catalyst may be 3-methylbutyn-2-ol ($HC{\equiv}C-C(CH_3)_2OH$). When present in the curable formulation, the (F) inhibitor may be at a concentration of from 1 part to 100 parts per 100 parts of (E1) hydrosilylation catalyst. Suitable (F) inhibitor may be readily prepared by numerous well-known methods or may be obtained from commercial suppliers such as Sigma-Aldrich Company, St. Louis, Mo., USA.

Constituent (G) a filler. The filler may be a metal particles, ceramic particles, silica, ground quartz, or a combination of any two or more thereof. The metal of the metal particles may be Ag, Au, Al, Co, Cu, Fe, Ni, Pd, Pt, Sn, Ti, Zn, or Zr; or a metal alloy of any two or more thereof; or a core-shell particles having a shell of the metal or metal alloy and a core of a different metal, a ceramic, carbon particles, or silicate glass spheres. The ceramic particles may be composed of a ceramic material that is or consists essentially of a nitride such as an aluminum nitride or boron nitride; a metal oxide such as aluminum oxide, beryllium oxide, copper oxide, magnesium oxide, nickel oxide, silver oxide, zinc oxide, or a combination of any two or more thereof; a metal hydroxide such as aluminum trihydrate or magnesium hydroxide; onyx, a metal carbide such as silicon carbide or tungsten carbide; or a metal titanate such as barium titanate. The silica may be a precipitated silica, fumed silica. The carbon particles may be carbon nanotubes (e.g., single-wall or multi-wall), powdered diamond, powdered graphite, graphene, carbon blacks, or a combination of any two or more thereof.

Constituent (H) a treating agent for treating the (G) filler. Examples of suitable (H) filler treating agents are disclosed in U.S. Pat. No. 6,169,142 at column 4, line 42, to column 5, line 2; and in U.S. Pat. No. 8,258,502 B2, for "component (VII)" in column 7, line 64, to column 8, line 50. When present in the curable formulation, the amount of constituent (H) may range from 0.01 to 5 wt %, alternatively from 0.05 to 2 wt %, alternatively from 0.1 to 1 wt % based on the total weight of the curable formulation Constituent (I) a vehicle. Types of the vehicle may be selected from a solvent, a diluent, and a dispersant. Examples of (I) vehicle are organic solvents such as toluene, xylenes, heptane, methyl ethyl ketone, and tetrahydrofuran and low kinematic viscosity silicone fluids such as a polydimethylsiloxane having a kinematic viscosity from 1 to 5 centipoise at 25° C. When present in the curable formulation, the amount of constituent (I) may range from 0.1 to 50 wt %, alternatively from 1 to 30 wt %, alternatively from 1 to 20 wt % based on the total weight of the curable formulation. Suitable (I) vehicle may be readily prepared by numerous well-known methods or may be obtained from commercial suppliers such as The Dow Chemical Company or Sigma-Aldrich Company.

Constituent (J) a colorant. The (J) colorant may be effective for imparting a visible color to the metal-polyorganosiloxane mixture/composition. The colorant may be a dye such as a fluorescent dye or an absorbing dye, a phosphor, a pigment, an optical diffusant, a photonic crystal, a plurality of quantum dots, nanoparticulate titanium dioxide, carbon nanotubes, and combinations of any two or more thereof. Examples of colorants are known in the art and are disclosed in U.S. Pat. Nos. 4,962,076; 5,051,455; and 5,053,442. The amount of constituent (L) depends on various factors including the optically active agent selected and the end use application. When present in the metal-polyorganosiloxane material, the amount of constituent (L) may range from 0.01 to 50 wt %, alternatively from 0.1 to 10 wt %, alternatively from 0.5 to 2 wt % based on the total weight of the metal-polyorganosiloxane material. Suitable (L) colorant may be readily prepared by numerous well-known methods or may be obtained from commercial suppliers.

The curable formulation may be free of, alternatively further comprise any one or more of, the following optional constituents: (K) an acid acceptor, (L) an antioxidant, (M) a chain extender, (N) a corrosion inhibitor, (O) a reactive diluent, (P) a stabilizer (e.g., for stabilizing the curable formulation and/or cured product thereof against exposure to heat and/or light), or (Q) a surfactant. As mentioned earlier, the curable formulation is addition curable such as hydrosilylation curable, free radical curable, or dual-curable. The dual-curable formulation may be curable by free radical and hydrosilylation curing mechanisms. The free radical curing may comprise radiation curing, peroxide curing, or both. The rate of curing may be enhanced by applying heat, pressure, or both to the curable formulation.

The curable formulation may be formulated as 1-part formulation or as multi-part formulation such as a 2-part formulation.

The curable formulation may be cured to give the cured product. The curing may be addition curing such as free radical curing or hydrosilylation curing. The curing may comprise heating the curable formulation at cure temperatures of from 70° to 200° C., alternatively 80° to 150° C., alternatively 90° to 120° C. Advantageously, the curing may produce a cured product that is free of bubbles (e.g., free of air bubbles when viewed at 10× magnification).

The curable formulation and cured product may be used as an adhesive, coating, elastomer, encapsulant, pottant, or sealant. The curable formulation, and cured product, is expected to have enhanced adhesion to a substrate compared to an identical formulation except lacking the metal aprotic organosilanoxide compound of formula (I), or a cured product prepared from the latter. The curable formulation or cured product may be applied to a substrate in need of adhesion, coating, elastomeric functionality, encapsulating, potting, or sealing. The applied curable formulation may be cured on the substrate to give the cured product on the substrate.

Substrate materials that are suitable for being adhered, coated, encapsulated, potted, or sealed with the formulations include silicate glass, metals, organic polymers, polyorganosiloxanes, wood, paper, and semiconductor materials such as silicon and silicon carbide. The substrate in need of adhesion, coating, encapsulating, potting, or sealing may be a container, fabric, plastic film, paper, printed circuit board, structural member of a machine, vehicle, or manufactured article, or textile.

The curable formulation and cured product are useful in a variety of industries such as building, construction, consumer products, electronics, energy, infrastructure, packaging, telecommunications, and transportation. For example, the curable formulation and cured product may be used as an adhesive as a tie layer in a photovoltaic cell module to adhere a photovoltaic cell to a substrate or superstrate thereof. The curable formulation and cured product may be used as a coating to coat an air bag in vehicular applications such as automotive applications. The curable formulation and cured product may be used as an elastomer for dampening vibrations of components of electronic devices. The curable formulation and cured product may be used as an encapsulant to encapsulate a solid state light such as a light-emitting diode (LED), a photovoltaic device such as a photovoltaic or solar panel or battery, or an electronic device such as a printed circuit. The curable formulation and cured product may be used as a pottant to pot a power converter component such as a microinverter. The curable formulation and cured product may be used as a sealant to seal a display panel to a frame of a smartphone or flat-screen television.

Advantageously, the cured silicone product prepared by curing the curable formulation may have improved tolerance for moisture content residing on surface of substrate in order for the cured product to achieve good adhesion to the substrate. This means that there may be no need to pre-dry the surface of the substrate before applying the inventive curable formulation thereto, especially when the moisture content of the surface of the substrate is from >0 to ≤1.8 wt %. In contrast, a cured product of an identical comparative (non-invention) curable formulation except lacking the metal aprotic organosilanoxide compound of formula (I) may have significantly lower adhesion to the surface of the substrate having the same moisture content.

Advantageously, the adhesion of the cured product prepared by curing the curable formulation may be further improved wherein the curable formulation is an addition curable formulation such as hydrosilylation curable or free radical curable. In order to achieve adhesion to a substrate by the hydrosilylation cured products prepared by hydrosilylation curing the hydrosilylation curable formulation, heating at relatively low adhesion-producing temperatures of from 70° to 120° C., alternatively 80° to 110° C., alternatively 90° to 100° C. may be sufficient. In contrast, an identical comparative (non-invention) hydrosilylation curable formulation except lacking the metal aprotic organosilanoxide compound of formula (I) may require higher adhesion-producing temperatures ≥140° C. The improvement in adhesion is enhanced further, and stability to heat may be beneficially increased, when the inventive hydrosilylation curable formulation contains a platinum hydrosilylation catalyst, whereas the non-invention hydrosilylation curable formulation contains a titanium catalyst such as tetrabutyl titanate and may exhibit poor heat stability.

Advantageously, the metal aprotic organosilanoxide compound of formula (I) may be a liquid, which enables increased compatibility with other silicones materials such as silicone prepolymers or curable silicone polymers such as those prepolymers and curable polymers based on dimethylsilicones or methyl, phenyl silicones. This compatibility can beneficially enable the curable formulation and cured product to be optically clear, enabling optical uses.

In some embodiments the curable formulation is cured, and the resulting cured product is used in low temperature environments (e.g., <100° C.); in moisture free or low relative humidity (<50% RH) environments; or both. In some embodiments when the curable formulation is cured or the resulting cured product is used at a temperature greater than 100° C., the relative humidity of the environment in which it is used is <50% RH, alternatively <40% RH, alternatively <30% RH.

This description has been written intentionally so that any one stated feature or limitation of an example, any one stated Markush subgenus or species, or any one stated number of a range or subrange, may be relied upon and provides adequate support for amending the claims. A catchall phrase such as "and a solvate thereof" and "or a combination of" any two or more thereof" that follows a listing of features or limitations applies independently to each one of the features or limitations, and also stands as a separate feature or limitation.

Unless otherwise defined herein, named general terms have the following meanings. Alternatively precedes a distinct embodiment. Articles "a", "an", and "the" each refer to one or more. Any comparative example is used for illustration purposes only and shall not be prior art. Free of or lacks means a complete absence of; alternatively not detectable, e.g., using nuclear magnetic resonance (NMR) spectroscopy (e.g., $^1$H-NMR, $^{13}$C-NMR, or $^{29}$Si-NMR) or Fourier Transform-Infrared (FT-IR) spectroscopy. Invention and inventive shall mean a representative embodiment or aspect, not the entire invention. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Removing a component from a mixture of components does not include selectively derivatizing/reacting the component to form a derivative/product unless the derivative/product is then physically separated from the other components of the mixture.

Unless otherwise defined herein, named chemical technology terms have the meanings defined by IUPAC or, for non-IUPAC terms, by Hawley's CONDENSED CHEMICAL DICTIONARY, 11$^{th}$ edition, N. Irving Sax & Richard J. Lewis, Sr., 1987 (Van Nostrand Reinhold). Some IUPAC terms are found in IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook. Aprotic means free of —OH, —NH, —SH, and —PH groups. Average molecular mass of a polymer such as weight average molecular mass ("M$_w$") is determined using gel permeation chromatography (GPC) with polystyrene standards. Chemical element and Group of chemical elements shall mean those published by IUPAC in the Periodic Table of the Elements, version dated 1 May 2013. Compound shall mean a molecule or collection of such molecules; composition shall mean a mixture of two or more different compounds, wherein the mixture may be configured to be non-curable, alternatively configured to be curable; formulation shall mean a composition configured for a particular use to have a particular material property such as an acoustical, chemical, electrical, magnetic, mechanical, optical, physical, radiological, or thermal property, or a combination of any two or more thereof. Cured product such as cured organosiloxane may have a structure that can be varied depending upon the particular reactants and curing conditions used to make it. This variability is not unlimited, but is restricted according to the structures of the reactants (e.g., backbone and/or curable group structures) and curing chemistry and conditions. Formulation, one-part, means a mixture containing all the constituents and in proportions needed to produce a cured product. The one-part formulation may use external factors such as moisture (for condensation curing), heat (for addition curing), or light (for addition curing) to initiate, speed or complete the curing process. Formulation, two-part, means a system that segregates different reactive constituents into two separate and complementary divisions to prevent premature initiation of curing. For example, a monomer, prepolymer, or curable polymer, but not a catalyst, may be included in a primary part; and a cure catalyst, but not a monomer, prepolymer, or curable polymer, may be included in a secondary part. Initiation of curing is achieved by combining the primary part and the secondary part together to form a one-part formulation. Substituted means having, in place of hydrogen, one or more substituents, including per substitution. Each substituent may independently be a halogen atom, —NH$_2$, —NHR, —NR$_2$, —NO$_2$, —OH, —OR, oxo (═O), —C≡N, —C(═)—R, —OC(═O)R, —C(═O)OH, —C(═O)OR, —SH, —SR, —SSH, —SSR, —SC(═O)R, —SO$_2$R, —OSO$_2$R, —SiR$_3$, or —Si(OR)$_3$; wherein each R independently is an unsubstituted (C$_1$-C$_{30}$)hydrocarbyl, alternatively (C$_1$-C$_6$)hydrocarbyl. Halogen atom is F, Cl, Br, or I; alternatively F, Cl, or Br; alternatively F or Cl; alternatively F; alternatively Cl. Each substituent, alternatively all substituents may be aprotic, alternatively protic. Vehicle means a liquid acting as a carrier, diluent, dispersant, storage medium, supernatant, or solvent for another material.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

In some aspects any composition or formulation described herein may contain any one or more of the chemical elements of Groups 1 to 18 of the Periodic Table of the Elements. In other aspects at least one such chemical element is specifically excluded from the composition or formulation, except where such exclusion would negate the same. E.g., Si atoms are not excluded from silicon compounds and carbon atoms are not excluded from organo groups. In some aspects elements that are not excluded are Si, O, H, C, N, F, Cl, Br, and I; alternatively Si, O, H, C, F, and Cl.

The invention is further illustrated by, and an invention embodiment may include any combinations of features and limitations of, the non-limiting examples thereof that follow. Ambient temperature is about 23° C. unless indicated otherwise.

EXAMPLES $^{29}$Si-NMR instrument and solvent: a Varian 400 MHz Mercury spectrometer was used. C$_6$D$_6$ was used as the solvent. The term —OH content used in the Preparations and Examples means the weight (or moles) of HO— groups as a percentage of total weight (or moles) of product, wherein only HO— groups that are bonded to silicon atoms are included.

Thermal Gradient Adhesion Test Method: used the test method described by D. Ahn, N. E. Shephard, et al., "Thermal Gradient Enabled XPS Analysis of PDMS Elastomer Adhesion to Polycarbonate", *Macromolecules,* 2007; 40:3904-3906, and its Supporting Information, except instead of polycarbonate substrate used poly(butylene terephthalate) (PBT) substrate and instead of Ahn et al.'s adhesive samples used the test materials described below. Each PBT substrate was either used as is or pre-dried, as the case may be. XPS is X-ray photoelectron spectroscopy. The test method used a test device sequentially comprising, from top to bottom, a top aluminum coupon, aluminum foil, an applied layer of test material, and a bottom aluminum coupon. The aluminum foil was adhered to the top aluminum coupon via a spray mount adhesive applied therebetween. The device further comprises two copper wires (1 mm diameter) that are disposed at each end of the PBT substrate to act as a spacer between the top aluminum coupon and the PBT substrate and maintain bondline thickness of the test material. The applied layer of test material is 0.38 mm thick. The top and bottom aluminum coupons were identical, each having a cooling passageway defined therethrough proximal a cooling end and heating passageway defined therethrough proximal a heating end, which is distal to the cooling end. The cooling passageways are configured for allowing flow of a coolant liquid therethrough each coupon so as to cool the cooling ends of the coupons. The heating passageways are configured for allowing flow of a heating liquid therethrough each coupon so as to heat the heating ends of the coupons. Together the cooling and heating of each coupon forms an identical thermal gradient lengthwise along each coupon, giving the coupons low temperature ($T_{low}$) cooling ends disposed opposite each other and high temperature ($T_{high}$) heating ends disposed opposite each other. $T_{high} > T_{low}$. E.g., $T_{high}$ may be 140° or 200° C. and $T_{low}$ may be 40° C. A thermal gradient along the coupons is calculated in ° C./mm=$T_{high}-T_{low}$)/L, wherein L is length of the coupons. During testing, the test device is pressed and the thermal gradient is applied to the applied layer of test material for 5 minutes. Then the thermal gradient is removed, and the top aluminum coupon is removed from the test device, carefully ensuring that the aluminum foil is released from the top aluminum coupon, to give a 3-layer laminate sequentially comprising the aluminum foil, the applied layer of test material, and the bottom aluminum coupon (and the Cu wires). At a first position ("cure front") along the applied layer of the laminate, the test material will have been hot enough to begin to cure. (Uncured material closer to the cooling end will be liquidous and able to be wiped away.) The lowest cure temperature at which the test material began to cure ($T_{cure}$) is determined by measuring the distance from the heating end of the bottom aluminum coupon to the first position, and factoring the thermal gradient to give $T_{cure}$. The $T_{cure}$ values obtained with $T_{high}$ of 140° are comparable to the $T_{cure}$ values obtained with $T_{high}$ of 200° C. because the thermal gradient factors are adjusted accordingly. The presence or absence of bubbling at the aluminum foil/test material interface was observed with a naked eye as a means of assessing shelf-life stability of the test material. An absence of bubbling indicated satisfactory shelf-life stability. Presence of a large bubble (diameter >1 mm), a channel, or numerous small bubbles (diameter <1 mm) between the aluminum foil and the test material indicated unsatisfactory shelf-life.

90° Peel Adhesion Test Method: Using the 3-layer laminate obtained from the Thermal Gradient Adhesion Test Method, edges of the aluminum foil were cut away with a sharp razor blade, leaving a 1.27 cm-wide peel strip in the center of the test material. An interfacial crack was initiated by making a cut in the aluminum foil 5±1 mm away from the first position nearer the cooling end of the applied layer of the test material, and manually peeling back the peel strip a few millimeters. A pulling force is applied to the cut aluminum foil at 90° (perpendicular) to the face of the laminate (a 1,500 gram weight is attached to the "cold" end of the peel strip). The interfacial crack is allowed to propagate as the bilayer comprising the aluminum foil and applied layer of test material is peeled away from the bottom aluminum coupon via adhesive failure. At a second position somewhere along the applied layer of test material, cohesive failure occurs, arresting the propagation of the interfacial crack. The cure temperature at which the cured test material experienced cohesive failure ($T_{CF}$) is determined by measuring the distance from the heating end of the bottom aluminum coupon to the second position, and factoring the thermal gradient to give $T_{CF}$. $T_{CF} \geq T_{cure}$. When $T_{cure}$ and $T_{CF}$ values are close, the Thermal Gradient Adhesion Test Method and 90° Peel Adhesion Test Method may be repeated except using a lower value for $T_{high}$ in the Thermal Gradient Adhesion Test Method to obtain better resolution. The maximum pulling force that is applied to the cut aluminum foil is recorded as Peak Stress in pound-force per square inch (lb-f/in$^2$), and converted herein to kilopascals (kPa). 1.00 lb-f/in$^2$ equals 6.89 kPa.

All other things being equal, the lower the value of $T_{CF}$ for an adhesive, the better the adhesive. This is because an adhesive cannot fail cohesively unless it adheres more strongly to the substrate (PBT) that it does to itself, and so the lower the value of $T_{CF}$ for an adhesive the lower the cure temperature needed to obtain strong adhesion of the test material to the substrate. The lower the cure temperature needed to obtain strong adhesion of the test material to the substrate, the lower the curing temperature that need be applied to obtain the strong adhesion. The lower the curing temperature that need be applied to obtain the strong adhesion, the wider the process window for manufacturing articles and devices containing the adhesive, the faster the cycle times, the more flexible the design options for the articles and devices, and the lower the energy costs.

Preparation A: a mixture of the following constituents: (B1) bis(vinyldimethylsiloxy)-terminated polydimethylsiloxane; (C1) bis(trimethylsiloxy)-terminated poly(dimethyl)(methyl,hydrogen)siloxane; (D1) 3-glycidoxypropyl-trimethylsilane; (E1-1) a platinum hydrosilylation catalyst; (F1) 3-methylbutyn-3-ol; (G1) treated silica that has been treated by (H1) vinyldimethylsilylated and (H2) trimethylsilylated; (G2) quartz (ground, 5 µm, 30 to <50 wt %); and (J1) carbon black (0.1 to <1 wt %). (May contain trace amounts of xylene, ethylbenzene, and aluminum oxide.)

Preparation 1: Synthesis of Example of Organosilol Compounds of Formula (II)

Preparation 1: mixed 101.6 grams (g) di(OH-terminated)-PDMS fluid (Gelest DMS-S12; "PDMS" means polydimethylsiloxane) with 33.2 g 1,2-divinyl-1,1,2,2-tetramethyldisilazane in a 250 mL three-neck flask. Added 0.1 g trifluoroacetic acid (TFA) to catalyze the reaction. Stirred the mixture for 80 minutes at room temperature, and then removed volatiles using a rotatory evaporator at 1-3 mm Hg vacuum for 2 hours at approximately 30° C. Produced desired product, which was the remainder (not the volatiles), as a clear liquid (114.2 g). Based on $^{29}$Si NMR, the product had —OH content of 3.2 wt % and Vi content of 5.5 wt % and included over 50 wt % of the following silicone fluid of formula: Vi(Me)$_2$Si[OSi(Me)$_2$]$_n$OH, wherein n is 5 or 6, Vi is vinyl, and Me is methyl.

Preparations A and 1 did not contain metal M$^1$ or constituent (A).

Preparations 1A, 1AA, 1B, 10, 1D, 1E, 1F, and 1G: Syntheses of Examples of the Metal Aprotic Organosilanoxide Compound of formula (I)

Preparation 1A: Synthesis of Metal Aprotic Organosilanoxide Compound (A1). Mixed 2.70 g aluminum secondary-butoxide solution (70% in secondary-butanol) with 8.0 g toluene and 15.70 g of the product silicone fluid of Preparation 1. Stirred the mixture at room temperature for 30 minutes, and then removed volatiles using a rotatory evaporator at 1-3 mm Hg vacuum for 2 hours at approximately 50° C. Produced product (A1), which was the remainder (not the volatiles), as a clear liquid (14.2 g) that was calculated, assuming mass balance conservation, to have an Al content of 0.54 millimoles Al per gram of product (mmol/g; 1.46 wt %) and Vi content of 2.0 mmol/g (5.4 wt %).

Preparation 1AA: Synthesis of Metal Aprotic Organosilanoxide Compound (A2). Mixed 3.68 g aluminum secondary-butoxide solution (70% in secondary-butanol) with 13.0 g toluene and 17.1 g of the product silicone fluid of Preparation 1. Stirred the mixture at room temperature for 30 minutes, and then removed volatiles using a rotatory evaporator at 1-3 mm Hg vacuum for 2 hours at approximately 50° C. Produced product (A2), which was the remainder (not the volatiles), as a clear liquid (15.6 g) that was calculated, assuming mass balance conservation, to have an Al content of 0.67 mmol/g (1.81 wt %) and Vi content of 2.0 mmol/g (5.4 wt %).

Preparation 1B: synthesis of metal aprotic organosilanoxide compound (A3). Mixed 1.90 g titanium tetraisopropoxide (TPT) with 8.0 g toluene and 16.35 g of the silicone fluid of Preparation 1. Stirred the mixture at room temperature for 30 minutes, and then removed volatiles using a rotatory evaporator at 1-3 mm Hg vacuum for 2 hours at approximately 50° C. Produced product (A3), which was the remainder (not the volatiles), as a clear liquid (15.15 g) that was calculated, assuming mass balance conservation, to have Ti content of 0.44 mmol/g (2.1 wt %) and a Vi content of 2.0 mmol/g (5.4 wt %).

Preparation 1C: synthesis of metal aprotic organosilanoxide compound (A4). Mixed 35 g zirconium n-propoxide (NPZ) solution (70% in n-propanol) with 8.0 g toluene and 15.60 g of the silicone fluid of Preparation 1. Stirred the mixture at room temperature for 30 minutes, and then removed volatiles using a rotatory evaporator at 1-3 mm Hg vacuum for 2 hours at approximately 50° C. Produced product (A4), which was the remainder (not the volatiles), as a clear liquid (14.4 g) that was calculated, assuming mass balance conservation, to have a Zr content of 0.35 mmol/g (3.2 wt %) and a Vi content of 2.0 mmol/g (5.4 wt %).

Preparation 1D (prophetic): synthesis of metal aprotic organosilanoxide compound (A5). Mix 5 g of the product of Preparation 1A with 5 g of the product of Preparation 1B to give 10 g of a product (A5) (remainder) as a clear liquid that is calculated, assuming mass balance conservation, to have an Al content of 0.27 mmol/g (0.73 wt %), a Ti content of 0.22 mmol/g (1.05 wt %), and a Vi content of 2.0 mmol/g (5.4 wt %).

Preparation 1E: (prophetic): synthesis of metal aprotic organosilanoxide compound (A6). Mix 5 g of the product of Preparation 1A with 5 g of the product of Preparation 10 to give 10 g of a product (A6) (remainder) as a clear liquid that is calculated, assuming mass balance conservation, to have an Al content of 0.27 mmol/g (0.73 wt %), a Zr content of 0.17 mmol/g (1.6 wt %), and a Vi content of 2.0 mmol/g (5.4 wt %).

Preparation 1F (prophetic): synthesis of metal aprotic organosilanoxide compound (A7). Repeat the procedure of Preparation 1A except use 2.70 g iron secondary-butoxide solution (70% in secondary-butanol) instead of the 2.70 g aluminum secondary-butoxide solution. Produce product (A7), which is the remainder (not the volatiles), as a clear liquid (14.2 g) that is calculated, assuming mass balance conservation, to have a Fe content of 0.54 mmol/g (3.1 wt %) and a Vi content of 2.0 mmol/g (5.4 wt %).

Preparation 1G (prophetic): synthesis of metal aprotic organosilanoxide compound (A8). Repeat the procedure of Preparation 1A except use 2.70 g vanadium secondary-butoxide solution (70% in secondary-butanol) instead of the 2.70 g aluminum secondary-butoxide solution. Produce product (A8), which is the remainder (not the volatiles), as a clear liquid (14.2 g) that is calculated, assuming mass balance conservation, to have a V content of 0.54 mmol/g (2.75 wt %) and a Vi content of 2.0 mmol/g (5.4 wt %).

Examples 1 to 5: preparation of curable formulations. In six separate experiments using a dental mixer, mixed 98 parts of Preparation A with 2.0 parts of a different one of the metal aprotic organosilanoxide compounds (A1), (A2), (A2) (again), (A3), and (A4) of Preparations 1A, 1AA, 1AA, 1B, and 10, respectively, to give curable formulations of Examples 1 to 5, respectively, shown with a negative control ("neg. control", Preparation A) below in Table 1.

TABLE 1

Curable formulations of Examples 1 to 5.

| Ex. No.: | (A) | (B1) | (C1) | (D1) | (E1-1) | (F1) | [(G1) + (H1)/(H2)] + (G2) | (J1) | Total (B1) to (J1) |
|---|---|---|---|---|---|---|---|---|---|
| Neg. Control (Prep A.) | 0 | >0* | >0 | >0 | >0 | >0 | >30 to 50 | 0.1 to <1 | 100 |
| Ex. 1 | 2.0 (A1) | >0 | >0 | >0 | >0 | >0 | >30 to 50 | 0.1 to <1 | 98 |
| Ex. 2 | 2.0 (A2) | >0 | >0 | >0 | >0 | >0 | >30 to 50 | 0.1 to <1 | 98 |
| Ex. 3 | 2.00 (A2) | >0 | >0 | >0 | >0 | >0 | >30 to 50 | 0.1 to <1 | 98 |
| Ex. 4 | 2.0 (A3) | >0 | >0 | >0 | >0 | >0 | >30 to 50 | 0.1 to <1 | 98 |
| Ex. 5 | 2.0 (A4) | >0 | >0 | >0 | >0 | >0 | >30 to 50 | 0.1 to <1 | 98 |

*The ">0" means constituent was present but exact concentration is not reported.

Examples A1 to A5: thermal gradient adhesion. In three separate runs, each of the curable formulations of Examples 1 to 5 were subjected to curing according to the Thermal Gradient Adhesion Test Method to give $T_{cure}$. The results for one of the runs are shown later in Table 4. Each PBT substrate was pre-dried prior to use except for Example 5.

Examples B1 to B5: 90° degree peel adhesion. The cured formulations from one of the runs of Examples A1 to A5 were subjected to the 90° Peel Adhesion Test Method to give $T_{CF}$ and initial (unaged) Peak Stress. The results are shown later in Table 4.

The presence or absence of bubbling in the cured formulations was observed. These observations are also shown below in Table 4.

TABLE 4

Curable formulations of Examples 1 to 5 after testing according to Examples A1 to A5 and B1 to B5.

| Ex. No.: | $T_{high}$ (° C.) | $T_{cure}$ (° C.) | $T_{CF}$ (° C.) | Initial Peak Stress (kPa) | Bubbling (Y/N) |
|---|---|---|---|---|---|
| Neg. Control (Prep A) | 200 | 98 | 176 | N/R* | N |
| Ex. 1 | 140 | 95 | ≤100 | N/R (Al foil broke***) | N |
| Ex. 2 | 140 | 93 | ≤98 | N/R (Al foil broke) | N |
| Ex. 3 | 140 | 97 | ≤105 | N/R (Al foil broke) | N |
| Ex. 4 | 140 | 91 | ≤96 | N/R (Al foil broke) | N |
| Ex. 5**** | 140 | 94 | ≤99 | N/R (Al foil broke) | N |

*N/R means Not Recorded;
**N/T means Not Tested;
***adhesion of cured product to PBT was stronger than aluminum foil's cohesive failure force;
****PBT substrate was not pre-dried.

As shown by the data in Table 4, compared to the negative control that does not contain the metal aprotic organosilanoxide compound of formula (I), the inventive curable formulations that contain the metal aprotic organosilanoxide compound of formula (I) (one of constituents (A1) to (A5), as the case may be), and the inventive cured products prepared therefrom by curing same, have two or more of the following advantageous technical effects (i) to (iv): (i) inventive Examples 1-5, and thus the metal aprotic organosilanoxide compound of formula (I), allow curing at lower cure temperatures ($T_{cure}$); (ii) inventive Examples Ex. 1-5, and thus the metal aprotic organosilanoxide compound of formula (I), give cured products that have substantially lower cohesive failure temperatures ($T_{CF}$); (iii) inventive Examples 1-5, and thus the metal aprotic organosilanoxide compound of formula (I), adhere more strongly to the PBT substrate than the aluminum foil coheres to itself; (iv) inventive Examples 1-5, and thus the metal aprotic organosilanoxide compound of formula (I), showed shelf-life stability (no bubbling).

Thus, the inventive formulation gives the cured product that has an improved cohesive failure temperature ($T_{CF}$) that is beneficially low (e.g., $T_{CD}$≤120° C., alternatively $T_{CF}$<120° C., alternatively $T_{CF}$≤110° C., alternatively $T_{CF}$<110° C., alternatively $T_{CF}$<100° C., alternatively $T_{CF}$ from 90° to <100° C.). The lower cohesive failure temperature of the inventive formulation, the lower the temperature required to cure the inventive formulation, and thus the larger the manufacturing process window for using the inventive formulation and the greater the types of thermally sensitive electronic components that could be used with the inventive formulation. The inventive formulation also has a satisfactory shelf-life. Thus, the inventive formulation is practical to use in a manufacturing setting because a manufacturer would not need to constantly make or get in a supply of fresh inventive formulation and would not need to store the inventive formulation at low temperature and quickly warm and use it.

The below claims are incorporated by reference here, and the terms "claim" and "claims" are replaced by the term "aspect" or "aspects," respectively. Embodiments of the invention also include these resulting numbered aspects.

The invention claimed is:

1. A curable formulation comprising constituents (A), (B), (C) and (D):
   (A) a metal aprotic organosilanoxide compound;
   (B) a polymerizable organosilicon compound having on average, per molecule, at least 2 silicon-bonded unsaturated aliphatic groups;
   (C) an organohydrogensilicon compound having on average, per molecule, at least two silicon-bonded hydrogen atoms; and
   (D) an organosilicon adhesion promoter containing at least one silicon atom, at least 3 silicon-bonded aprotic leaving groups, and at least one silicon-bonded curable group other than a leaving group;
   wherein the (A) metal aprotic organosilanoxide compound is of formula (I):

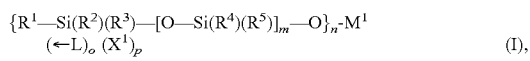

(I), wherein $M^1$ is a metal atom Al, Fe, Sn, or Zr having a formal positive oxidation state, $\delta^+$, of +1 to +3 for Al, +1 to +6 for Fe, +1 to +4 for Sn, subscript n is an integer from 1 to $\delta^+$; subscript o is an integer of 0, 1 or 2; each L independently is an aprotic Lewis base; subscript p=($\delta^+$−n); each $X^1$ independently is a halide or an aprotic organoheteryl anion; subscript m is an integer from 3 to 100; each of $R^1$ to $R^5$ is independently is an aprotic ($C_1$-$C_{20}$)hydrocarbyl group or aprotic ($C_2$-$C_{20}$) heterohydrocarbyl group; provided that when $M^1$ is Zr, subscript n is $\delta^+$.

2. The curable formulation of claim 1 wherein none of $R^1$ to $R^5$ contain a carbon-carbon double or triple bond.

3. The curable formulation of claim 1 wherein at least one of $R^1$ to $R^5$ independently is an aprotic ($C_2$-$C_{20}$)alkenyl group or aprotic ($C_2$-$C_{20}$)alkynyl group.

4. The curable formulation of claim 1 wherein at least one $M^1$ is Al, Fe or Sn.

5. The curable formulation of claim 1 wherein subscript n is an integer from 2 to $\delta^+$.

6. The curable formulation of claim 1 wherein subscript o is an integer 0 or subscript o is an integer 1 or 2.

7. The curable formulation of claim 1 wherein subscript m is an integer from 3 to 50.

8. The curable formulation of claim 1 wherein the concentration of the (A) metal aprotic organosilanoxide compound of formula (I) is 0.01 to 10 weight percent (wt %) of the curable formulation.

9. The curable formulation of claim 1 wherein
   the (B) polymerizable organosilicon compound is selected from an organosilane having on average, per molecule, 1 silicon atom and at least 2 unsaturated aliphatic groups; an oligoorganosiloxane having on average, per molecule, from 2 to 4 silicon atoms and at least 2 unsaturated aliphatic groups; a polyorganosiloxane having on average, per molecule, 5 or more silicon atoms and at least 2 unsaturated aliphatic groups; and a combination of any two or more thereof; or the (C) organohydrogensilicon compound has on average, per molecule, from 1 to 100 silicon atoms and/or at least 2.2 silicon-bonded hydrogen atoms; or in the (D) organosilicon adhesion promoter each silicon-bonded aprotic leaving group is independently a silicon-bonded aprotic alkoxy group, a silicon-bonded aprotic aliphatic carboxy group, a silicon-bonded aprotic dialkylamino group, a silicon-bonded halogen, or a silicon-bonded aprotic oximo group; and/or each silicon-bonded curable group other than a leaving group is independently an epoxy-functional hydrocarbyl group, a monovalent unsaturated aliphatic group that is free of an oxo (i.e., =O) group, a monovalent unsaturated aliphatic carboxylic ester group, a monovalent isocyanate group, a monovalent aldehydic group (i.e., —C(=O)H), or a hybrid group of any two or more thereof; or a combination of any two thereof.

10. The curable formulation of claim 1 further comprising one or more additional constituent other than the constituents (A) to (D), selected from (E) a cure agent; (F) an inhibitor of a hydrosilylation catalyst; (G) a filler; (H) a treating agent for treating the (G) filler; (I) a vehicle; (J) a colorant.

11. A cured product obtained by curing the curable formulation of claim 1.

12. A method of making a cured product, the method comprising subjecting the curable formulation of claim 1 to a cure temperature from 30° to 250° C. to give the cured product.

* * * * *